(12) United States Patent
Soh et al.

(10) Patent No.: US 7,843,999 B2
(45) Date of Patent: Nov. 30, 2010

(54) METHOD OF SELECTING A REFERENCE PICTURE

(75) Inventors: Yoon Seong Soh, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 10/541,540

(22) PCT Filed: Mar. 3, 2004

(86) PCT No.: PCT/KR2004/000445

§ 371 (c)(1),
(2), (4) Date: May 19, 2006

(87) PCT Pub. No.: WO2004/080078

PCT Pub. Date: Sep. 16, 2004

(65) Prior Publication Data

US 2006/0239358 A1 Oct. 26, 2006

(30) Foreign Application Priority Data

Mar. 3, 2003 (KR) .................. 10-2003-0013198

(51) Int. Cl.
*H04B 1/66* (2006.01)
*H04N 7/12* (2006.01)
(52) U.S. Cl. .............................. 375/240.24
(58) Field of Classification Search ............ 375/240.12, 375/240.26, 240.25, 240.24, 240, 240.29; 348/413.1, 415.1; 382/232; *H04B 1/66; H04N 7/12*
See application file for complete search history.

(56) References Cited

U.S. PATENT DOCUMENTS 5,561,465 A * 10/1996 Fautier et al. .......... 375/240.12

6,072,548 A * 6/2000 Schoner et al. ........ 375/240.26

(Continued)

FOREIGN PATENT DOCUMENTS

CA 2473898 6/2004

(Continued)

OTHER PUBLICATIONS

"Selective Fast Motion Estimation with Variable Motion Block Sizes", Proc. Intern. Workshop on Advanced Image Technology, pp. 101-106, Jan. 2003. See the whale document.

(Continued)

*Primary Examiner*—Tung Vo
(74) *Attorney, Agent, or Firm*—Harness, Dickey & Pierce, P.L.C.

(57) ABSTRACT

The present invention relates to a method for coding a moving picture in a moving picture coding system using multiple reference picture. According to the method for coding an interlaced moving picture into a frame picture having frame/field macroblock, a reference picture index of the frame macroblock is determined at a macroblock level by determining the reference picture index of frame unit at a picture (or slice) level and respectively allocating a lower index and a higher index to a top reference field and a bottom reference field while sequentially visiting the reference frames according to an order of reference picture index of frame unit, the top and bottom field indexes being giving by an equation: top reference field index=2×picture index of reference frame; and bottom reference field index=2×picture index of reference frame+1.

2 Claims, 9 Drawing Sheets

U.S. PATENT DOCUMENTS

| | | | | |
|---|---|---|---|---|
| 6,453,115 | B1* | 9/2002 | Boyle | 386/68 |
| 6,480,543 | B1* | 11/2002 | Pau et al. | 375/240.16 |
| 6,584,152 | B2* | 6/2003 | Sporer et al. | 375/240.01 |
| 6,625,320 | B1* | 9/2003 | Nilsson et al. | 382/238 |
| 6,658,056 | B1* | 12/2003 | Duruoz et al. | 375/240 |
| 6,917,652 | B2* | 7/2005 | Lyu | 375/240.25 |
| 6,968,003 | B1* | 11/2005 | Gonzales et al. | 375/240 |
| 6,980,596 | B2 | 12/2005 | Wang et al. | |
| 7,003,035 | B2* | 2/2006 | Tourapis et al. | 375/240.12 |
| 7,010,046 | B2* | 3/2006 | Trevers et al. | 375/240.29 |
| 7,310,373 | B2* | 12/2007 | Kondo et al. | 375/240.16 |
| 7,333,545 | B2* | 2/2008 | Duruoz et al. | 375/240.25 |
| 2001/0024472 | A1* | 9/2001 | Sporer et al. | 375/240.16 |
| 2001/0043796 | A1* | 11/2001 | Ishikawa | 386/69 |
| 2003/0099292 | A1 | 5/2003 | Wang et al. | |
| 2003/0099294 | A1* | 5/2003 | Wang et al. | 375/240.15 |
| 2003/0133506 | A1* | 7/2003 | Haneda | 375/240.25 |
| 2004/0076236 | A1* | 4/2004 | Duruoz et al. | 375/240.25 |
| 2004/0086044 | A1 | 5/2004 | Kondo et al. | |
| 2004/0146109 | A1* | 7/2004 | Kondo et al. | 375/240.16 |
| 2004/0151248 | A1* | 8/2004 | Kondo et al. | 375/240.16 |
| 2004/0264570 | A1* | 12/2004 | Kondo et al. | 375/240.16 |
| 2005/0041742 | A1* | 2/2005 | Abe et al. | 375/240.24 |
| 2005/0152454 | A1* | 7/2005 | Wang et al. | 375/240.16 |
| 2006/0008010 | A1 | 1/2006 | Soh et al. | |
| 2006/0109913 | A1 | 5/2006 | Wang et al. | |
| 2006/0239358 | A1 | 10/2006 | Soh et al. | |
| 2008/0037653 | A1* | 2/2008 | Soh et al. | 375/240.24 |
| 2008/0037654 | A1* | 2/2008 | Soh et al. | 375/240.24 |
| 2008/0037655 | A1* | 2/2008 | Soh et al. | 375/240.24 |
| 2008/0063075 | A1* | 3/2008 | Kondo et al. | 375/240.16 |
| 2009/0110064 | A1 | 4/2009 | Soh et al. | |
| 2009/0110080 | A1 | 4/2009 | Soh et al. | |
| 2009/0116553 | A1 | 5/2009 | Soh et al. | |
| 2009/0116559 | A1 | 5/2009 | Soh et al. | |
| 2009/0116560 | A1 | 5/2009 | Soh et al. | |
| 2009/0122871 | A1 | 5/2009 | Soh et al. | |
| 2009/0128689 | A1 | 5/2009 | Soh et al. | |
| 2009/0129462 | A1 | 5/2009 | Soh et al. | |
| 2009/0129463 | A1 | 5/2009 | Soh et al. | |
| 2009/0129475 | A1 | 5/2009 | Soh et al. | |
| 2009/0129480 | A1 | 5/2009 | Soh et al. | |
| 2009/0129482 | A1 | 5/2009 | Soh et al. | |
| 2009/0135900 | A1 | 5/2009 | Soh et al. | |

FOREIGN PATENT DOCUMENTS

| | | |
|---|---|---|
| EP | 1414245 | 4/2004 |
| EP | 1569459 | 8/2005 |
| JP | 2004-194297 | 7/2004 |
| WO | WO 03/047271 | 5/2003 |

OTHER PUBLICATIONS

ITU—Telecommunications Standardization Sector, Study Group 16 Question 6, Video Coding Experts Group (VCEG), 14th Meeting: Santa Barbara, CA, USA, Sep. 24-27, 2001. See the whole document.
ITU-T Recommendation H.262 and ISO/IEC 13818-2, Generic Coding of Moving Pictures and Associated Audio Information: Video, 1995. See the whole document.
UK Office Action dated Oct. 10, 2006.
UK Office Action dated Jun. 22, 2006.
Canadian Office Action dated Jun. 12, 2006.
Working Draft No. 2. Revision 8 (WD-2 rev 8) Joint Video Team (JVT) of ISO/IEC MPEG) and ITU-T VCEG, GENEVA; Jan. 29-Feb. 1, 2002; pp. 1-38.
Korean Office Action dated Sep. 30, 2005.
UK Office Action dated Oct. 20, 2005.
ITU- Telecommunications Standardization Sector, Study Group 16, Question 6, Video Coding Experts Group (VCEG), 14th Meeting: Santa Barbara, CA, USA, Sep. 24-27, 2001, pp. 1-10.
JVT-B118r*, Joint Video Team (JVT) of ISO/IEC MPEG and ITU-T VCEG, Jan. 29-Feb. 1, 2002, pp. 35 and 36.
EP Search Report dated Dec. 9, 2008.
Wang: "MB adaptive field/frame coding for interlace sequences" Joint Video Team JVT of ISO?IEC MPEG and ITU-T VCEG, No. JVT-D108, Jul. 26, 2002, pp. 1-12.
Wiegand: "Editor's latest draft of JVT WD2 design" Joint Video Team JVT of ISO-IEC MPEG and ITU-T VCEG, No. JVT-C039, May 10, 2002, pp. 1-112.
Chad Fogg Pixonics et al: "Adaptive Filed/Frame Block Coding Experiment Proposal", ITU-T, SG 16 Q6, Video Coding Experts Group VCEG, No. VCEG-N76, Sep. 24, 2001, pp. 1-7.
Wiegand: "Multi-picture handling" Joint Video Team JVT of ISO-IEC MPEG and ITU-T VCEG, No. JVT-D018, Jul. 26, 2002, pp. 1-7.
Wiegand: "Multi-picure handling", Joint Video Team JVT of ISO-IEC MPEG and ITU-T VCEG, No. JVT-D018, Jul. 26, 2002, powerpoint presentation, pp. 1-6.
European Patent Office Search report dated Apr. 29, 2009 for counterpart European application.
JVT: Study of Final Committee Draft of Joint Video Specification (ITU-T Rec. H.264, ISO/IEC 14496-10 AVC), Joint Video Team (JVT) of ISO/IEC MPEG & ITU-T VCEG (ISO/IEC JTC1/SC29/WG11 and ITU-T SG16 Q6), No. JVT-F100, Feb. 16, 2003, pp. I-XV, 1-226, XP030005665.
Nilsson: "Reference picture buffering text changes" Joint Video Team (JVT) of ISO/IEC MPEG & ITU-T VCEG (ISO/IEC JTC1/SC29/WG11 and ITU-T SG16 Q6), No. JVT-E149r5, Oct. 18, 2002, pp. I-XX, 1-207, EX030005566.
Japanese Office Action dated Sep. 30, 2009.
Japanese Office Action dated Oct. 2, 2009.
Thomas Wiegand. "Study of Final Committee Draft of Joint Video Specification". p. i, 75-81, 104-105. Dec. 2002.
Rajeev Gandhi et al. "Macroblock Adaptive Frame/Field Coding for Interlace Sequences". p. 1-6. Jul. 22-26, 2002.
L. Wang et al. "Interlace Coding Tools for H.26L Video Coding". p. 1-11. Dec. 4-6, 2001.
Office Action for corresponding U.S. Appl. No. 12/232,955 dated Feb. 16, 2010.
Office Action for corresponding U.S. Appl. No. 12/285,050 dated Feb. 25, 2010.
Office Action for corresponding U.S. Appl. No. 12/285,293 dated Feb. 24, 2010.
Office Action for corresponding U.S. Appl. No. 12/285,051 dated Mar. 11, 2010.
Office Action for corresponding U.S. Appl. No. 12/232,954 dated Feb. 25, 2010.
Office Action for corresponding U.S. Appl. No. 12/285,151 dated Feb. 25, 2010.
Office Action for corresponding U.S. Appl. No. 12/285,053 dated Mar. 11, 2010.
Office Action for corresponding U.S. Appl. No. 12/232,957 dated Feb. 16, 2010.
Office Action for corresponding U.S. Appl. No. 12/232,052 dated Mar. 11, 2010.
Choi, Woong II et al. "Selective Fast Motion Estimation with Variable Motion Block Sizes." School of Information and Communication Engineering.
"Core Experiment on Interlaced Video Coding." ITU—Telecommunications Standardization Sector, Study Group 16 Question 6; Document VCEG-N85, Oct. 29, 2001.
Recommendation ITU-T H.262 (1995 E); ISO/IEC 13818-2: 1995.

* cited by examiner

[Fig.1]
|   |   |   |   |
|---|---|---|---|
| 0 | 2 | 4 | 6 |
| 1 | 3 | 5 | 7 |
| 8 | 10 | 12 | 14 |
| 9 | 11 | 13 | 15 |
[Fig.2]
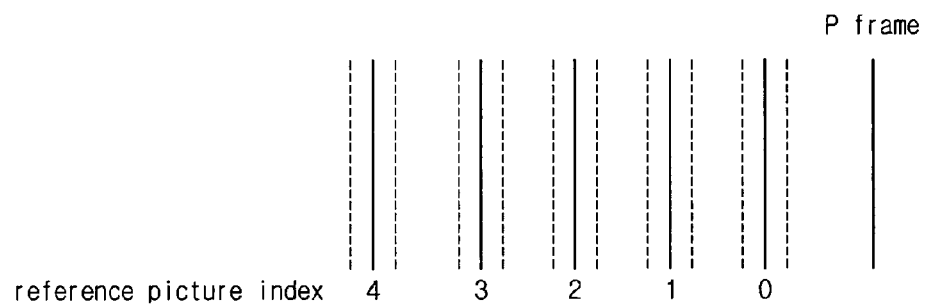

[Fig.3]
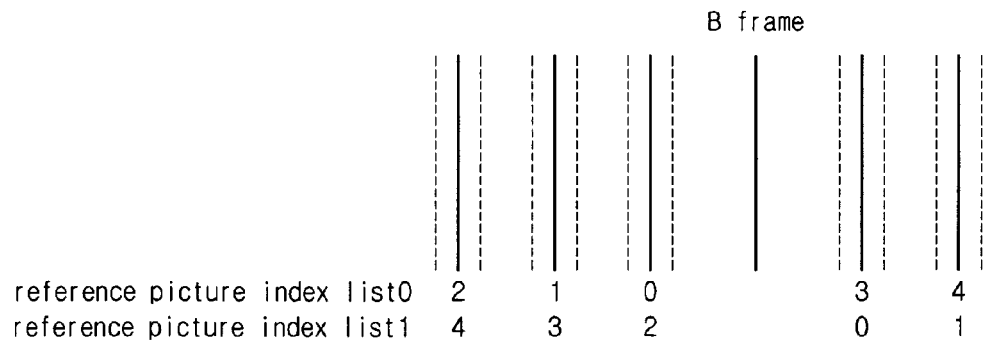
[Fig.4]
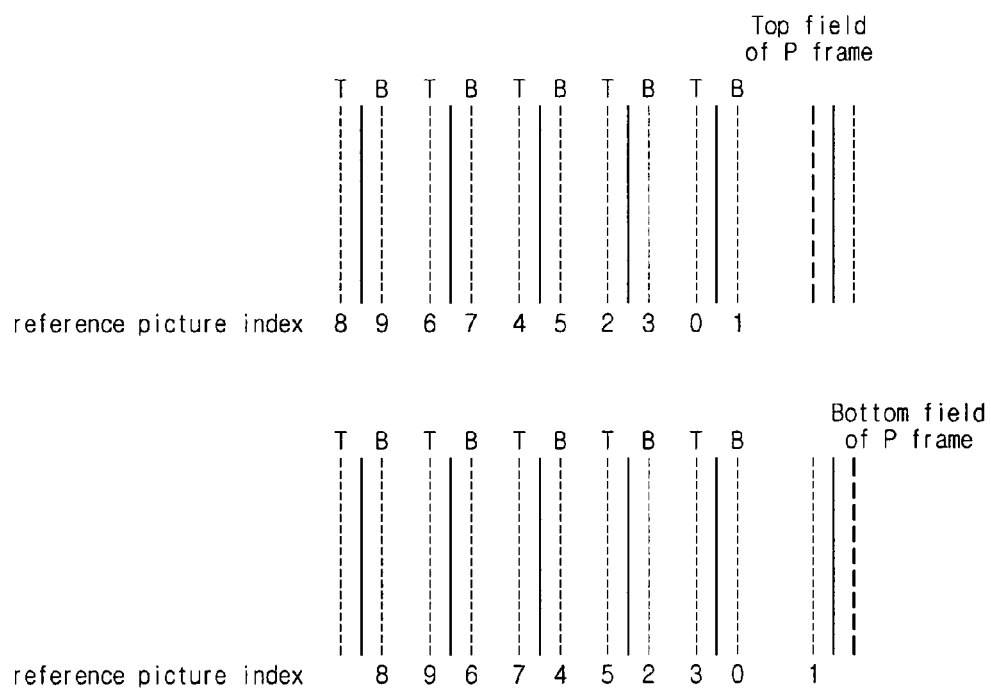

[Fig.5]
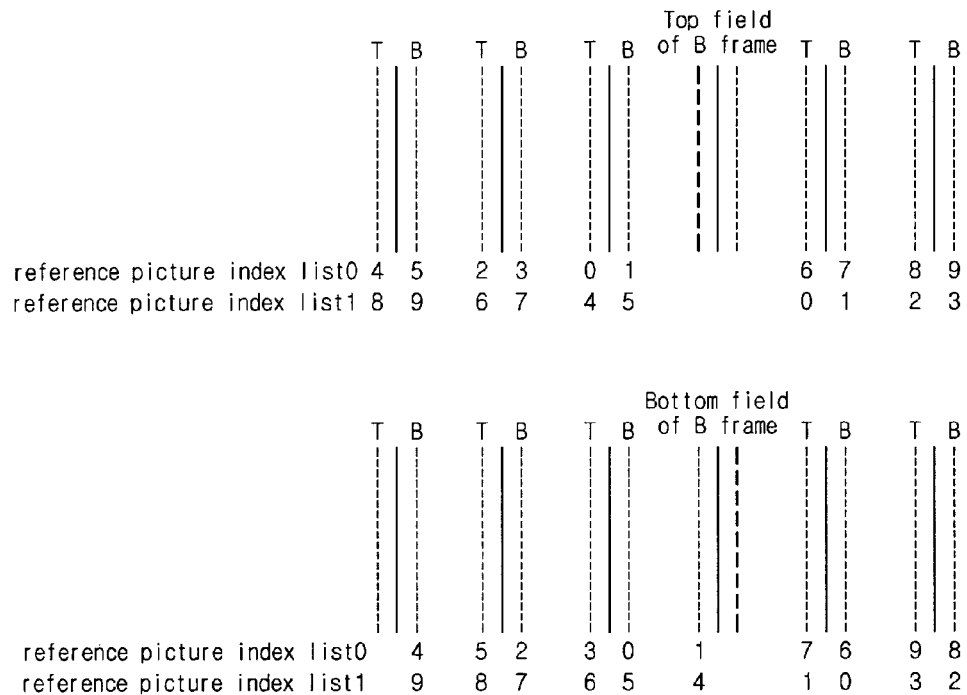
[Fig.6]
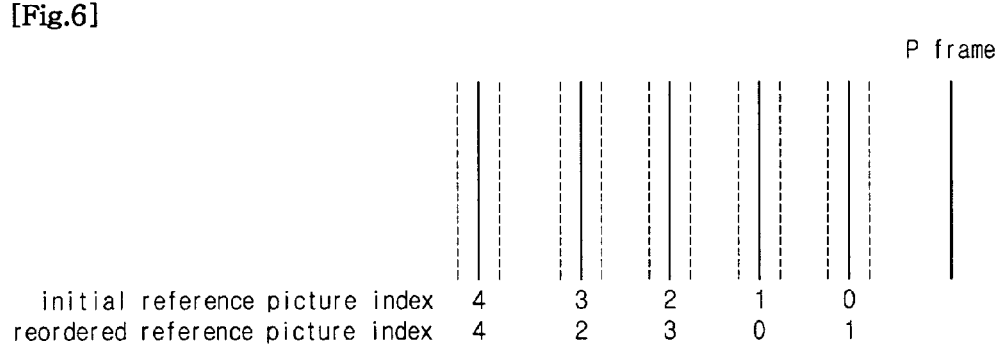

[Fig.7]
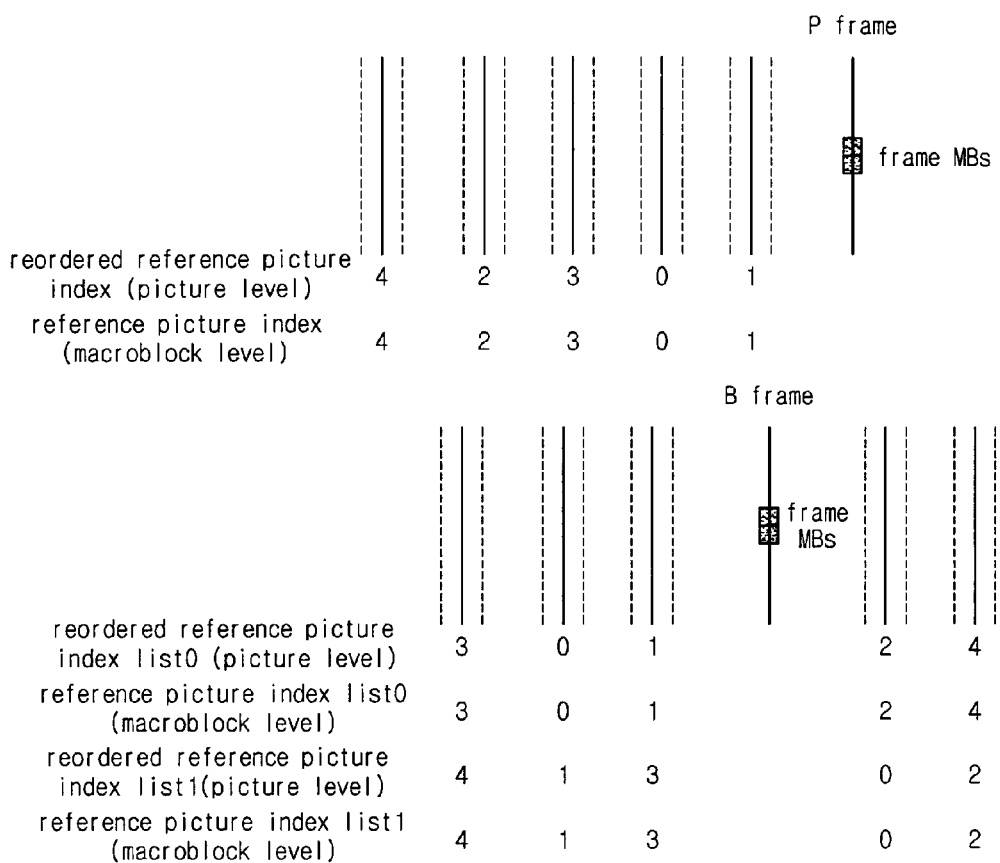

[Fig.8]
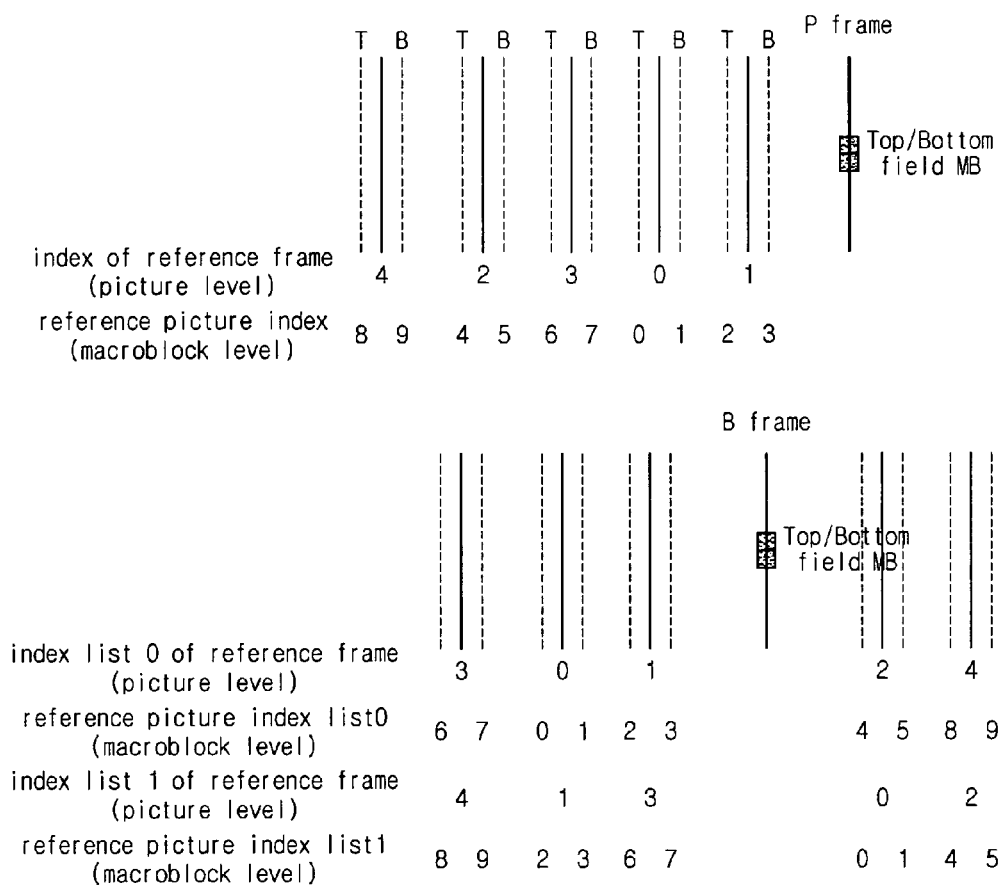

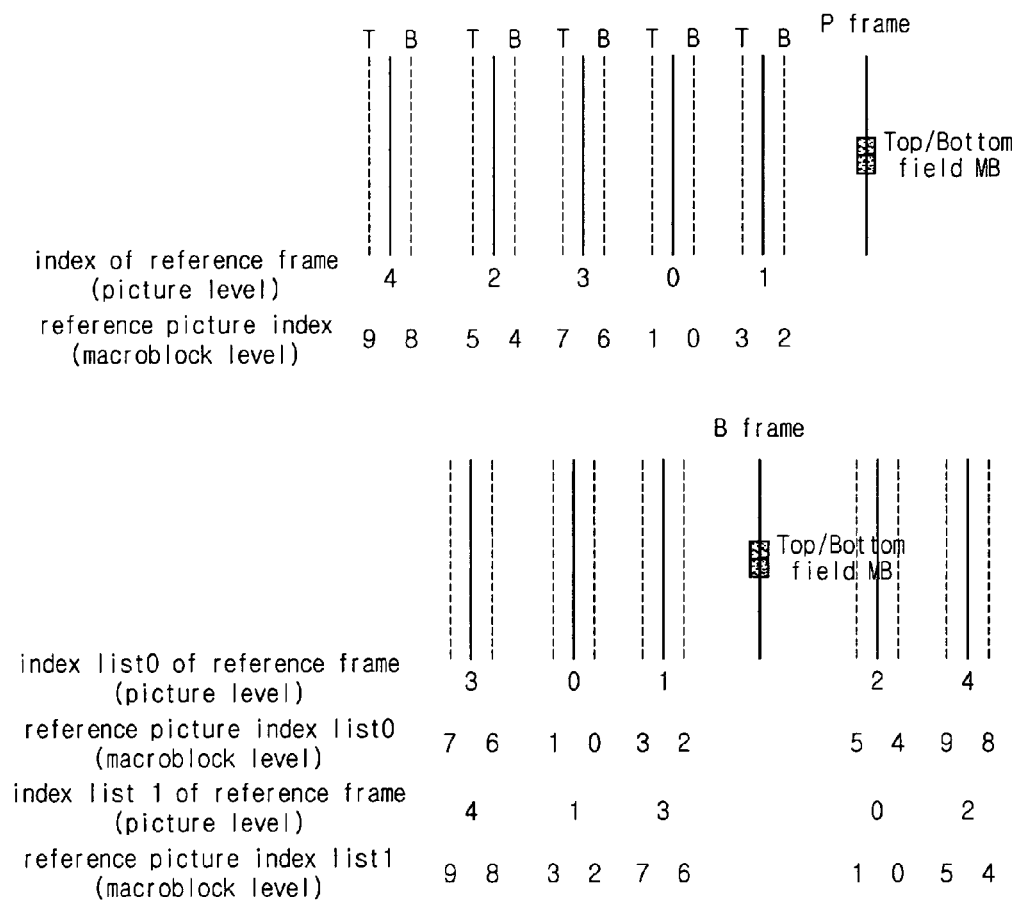
[Fig.9]

[Fig.10]
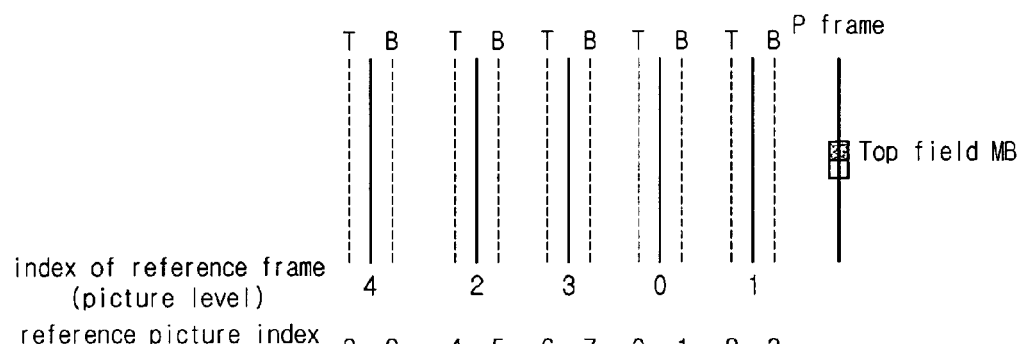
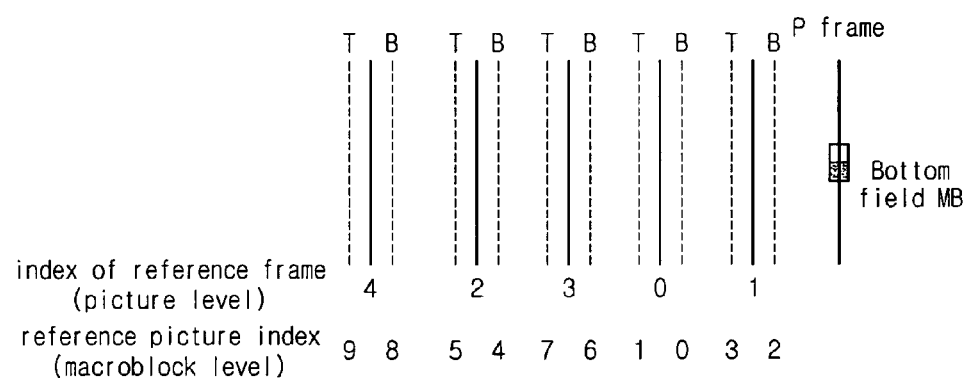

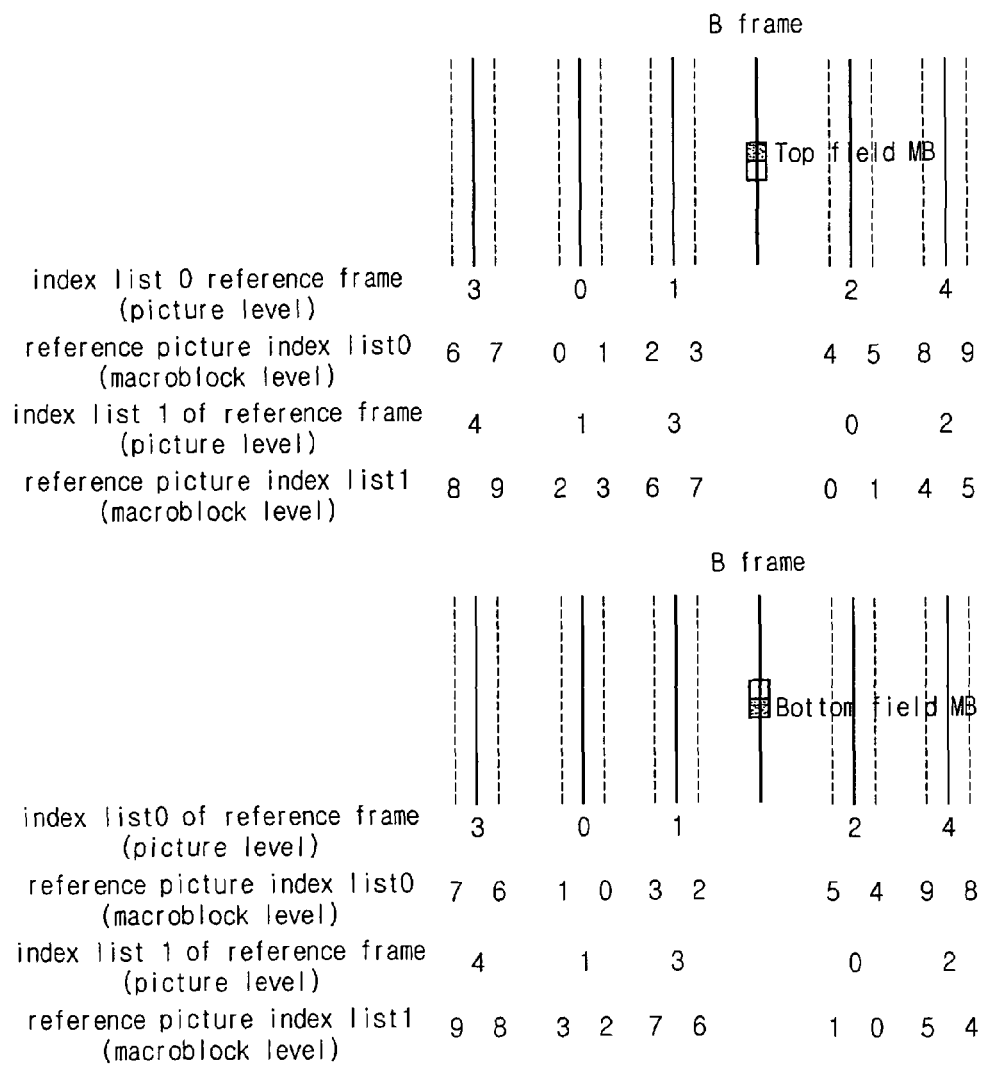
[Fig.11]

[Fig.12]
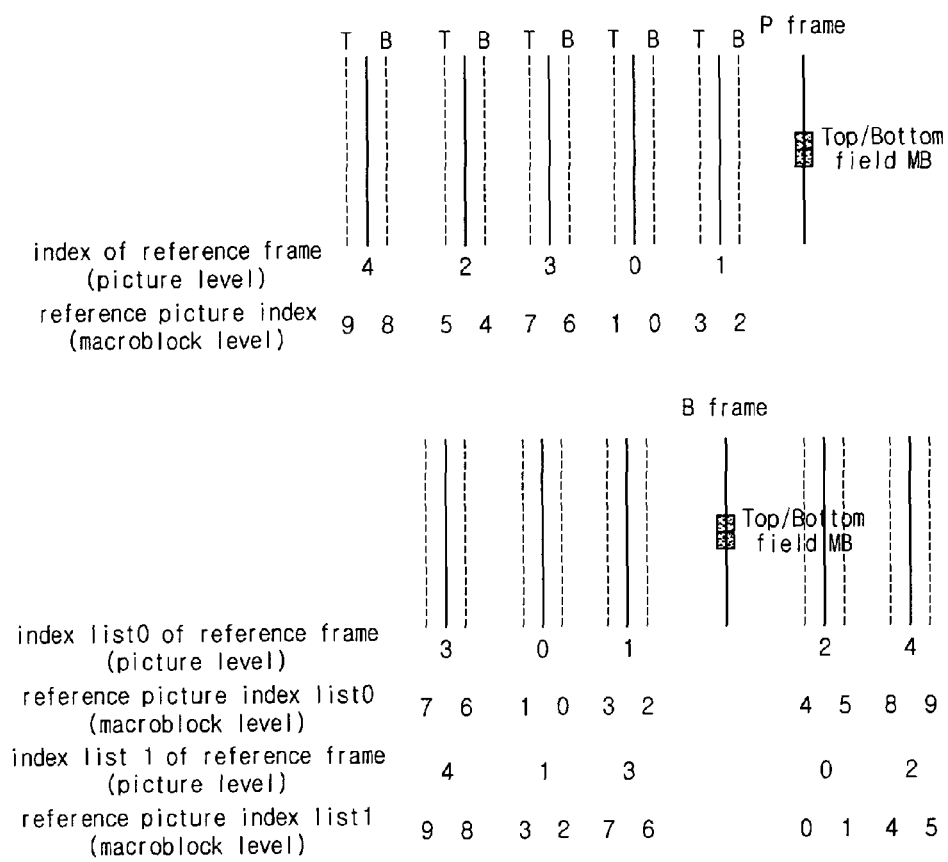

METHOD OF SELECTING A REFERENCE PICTURE

PRIORITY INFORMATION

This application is the national phase under 35 U.S.C. §371 of PCT International Application No. PCT/KR2004/00445 which has an international filing date of Mar. 3, 2004, which designated the United States of America and which claims priority on Korean Application No. 10-2003-0013198 filed Mar. 3, 2003, the entire contents of both of which are hereby incorporated herein by reference.

TECHNICAL FIELD

The present invention relates to a method for coding a moving picture, and more particularly, to a method for coding interlaced moving picture into frame picture having frame/field macroblock in a moving picture coding system that uses multiple reference pictures.

BACKGROUND ART

Moving picture coding system compensates for motion using motion vector information. In case of moving picture coding system that uses multiple reference picture, reference picture index information as well as motion vector information is required for motion compensation. The reference picture index is a value that is used to distinguish multiple reference pictures from each other. A coder transfers the reference picture index to a decoder, and the decoder performs motion compensation from reference picture that is indicated by the reference picture index.

Generally, scanning methods are classified into a progressive scanning and an interlaced scanning. In case of the progressive scanning, an image of one frame consists of data that are sampled at the same time. In case of the interlaced scanning, an image of one frame consists of data that are sampled at different times, and the samples are alternated line by line.

The interlaced image of a frame is divided into a top field and a bottom field. In the interlaced scanning, one frame is divided into two field images. In this specification, an image is treated based on unit of picture. A frame or a field may be allocated to the picture.

Three coding methods for an interlaced moving picture are proposed. A first coding method is a field picture coding method which performs a coding process, considering each field as an independent picture at a picture or slice level. A second coding method is the frame picture coding method which performs a coding process after combining two fields into one frame at a picture or slice level. A third coding method is a frame picture coding method with frame/field macroblock, which performs a coding process by combining two fields into one frame and selecting a frame mode or a field mode at a macroblock level.

In the third coding method, two vertically adjacent macroblocks are bound into a pair and the coding is performed in unit of macroblock pair. In FIG. 1, numbers assigned in the macroblock pairs indicate macroblock addresses that are used to distinguish the macroblocks from each other.

Here, frame macroblock is a macroblock which is coded at upper and lower macroblocks of the macroblock pair in unit of frame. In other words, each macroblock is coded in unit of frame after two fields are combined into one frame.

Meanwhile, field macroblock is a macroblock that is coded at upper and lower macroblocks of macroblock pair in unit of field. The macroblock pair is divided into top and independently. At this time, the macroblock pairs are rearranged so that the upper and lower macroblocks may respectively contain only top field component and only bottom field component. The upper macroblock is called a top field macroblock and the lower macroblock is called a bottom field macroblock.

Reference buffer for storing multiple reference pictures are configured in unit of frame. In the frame picture coding, all reference pictures are considered as units of frame in which two fields are combined into one frame, and one picture among the reference frame pictures is used for motion compensation. Accordingly, values are allocated to the reference picture indexes in unit of frame.

The reference picture index for P frame is obtained by sorting all the reference frames in an order reverse to a coding order and then sequentially allocating an index, which is increased by one, to the sorted reference frames. The reference picture index for B frame is classified into list 0 and list 1 and is determined based on a display order of the reference frame.

First, in case of the reference frame list 0, indexes are allocated in a reverse order to the reference frames whose display order lags behind the B frame, and then, the remaining indexes are allocated in the display order to the reference frames whose display order leads the B frame. In case of the reference frame list 1, in contrast to the reference frame list 0, indexes are allocated in the display order to the reference frames whose display order leads the B frame, and then, the remaining indexes are allocated in a reverse order to the reference frame whose display order lags behind the B frame. FIG. 2 shows a reference picture index for P frame when a size of the reference buffer is 5, and FIG. 3 shows the reference picture index lists 0 and 1 for B frame.

In the field picture coding, the fields of all reference pictures are considered as independent pictures and one of the reference field pictures is used for motion compensation. Accordingly, values are allocated to the reference picture indexes in unit of field. At this time, the reference fields are combined in the unit of frame, and then, the reference picture indexes in each field of the P frame are sorted in an order reverse to a coding order of the frame. Then, index values that are increased by one are alternately allocated in an order that starts from a reference field having parity equal to a current picture to a reference field having parity different from the current picture, while visiting the sorted reference frames in sequence.

In addition, in case of the reference picture index lists 0 and 1 for each field of B frame, all the reference fields are combined in unit of frame and then a reference frame is sorted in the same manner as a method of determining reference frame index of B frame. Thereafter, the indexes that are increased by one are alternately allocated in an order that starts from a reference field having parity equal to a current picture to a reference field having parity different from the current picture, while visiting the sorted reference frames in sequence.

FIG. 4 shows reference picture indexes of top and bottom fields of P frame when a size of reference buffer is 5, and FIG. 5 shows reference picture index lists 0 and 1 of top and bottom fields of B frame that can be used as a reference.

In order to improve coding efficiency, the moving picture coding system using multiple reference pictures provides a function of reordering the reference picture indexes before decoding a picture or a slice. It is arbitrarily reordering the reference picture indexes so as to enhance the coding efficiency after determining initial reference picture index for the frame and field pictures. FIG. 6 shows a result of determining initial reference picture index for P frame and arbitrarily reordering indexes according to the above-described method.

When the moving picture coding system using the multiple reference pictures codes an interlaced moving picture into a frame picture having frame/field macroblock, all the reference pictures for the frame macroblock are considered as frame unit and one of the reference frame pictures must be used for motion compensation. In addition, and fields of all the reference pictures for the field macroblock are considered as independent pictures and one of the reference field pictures must be used for motion compensation.

Accordingly, in the frame picture coding that selects the frame/field coding modes at the macroblock level, it is necessary to allocate values to the reference picture index in frame unit or field unit according to the coding mode of each macroblock.

DISCLOSURE OF THE INVENTION

Accordingly, the present invention is directed to a method for coding a moving picture that substantially obviates one or more of the problems due to limitations and disadvantages of the related art.

An object of the present invention is to provide a method for coding a moving picture, which efficiently provides reference picture information used for motion compensation by determining the reference picture index differently according a coding mode of macroblock when interlaced moving picture is coded with a frame picture having frame/field macroblocks in a moving picture coding system using multiple reference pictures.

Additional features and advantages of the invention will be set forth in the description which follows, and in part will be apparent from the description, or may be learned by practice of the invention. The objectives and other advantages of the invention will be realized and attained by the structure particularly pointed out in the written description an claim thereof as well as the appended drawings.

To achieve these and other advantages and in accordance with the purpose of the present invention, as embodied and broadly described, there is provided a method for coding a moving picture in a moving picture coding system using multiple reference picture, a method for setting a reference index, when an interlaced moving picture is coded into a frame picture having frame/field macroblock. The method comprising: (a) determining reference picture index of frame unit at a picture (or slice) level; and (b) determining reference picture index according to a coding mode of the macroblock on the basis of the reference picture index of frame unit at a macroblock level.

According to another embodiment of the present invention, there is provided a method for coding an interlaced moving picture into a frame picture having frame/field macroblock in a moving picture coding system using multiple reference picture, wherein a reference picture index of the frame macroblock is determined at a macroblock level by determining the reference picture index of frame unit at a picture (or slice) level and the reference picture index of frame unit is used.

According to further another embodiment of the present invention, there is provided a method for coding an interlaced moving picture into a frame picture having frame/field macroblock in a moving picture coding system using multiple reference picture, wherein a reference picture index of the frame macroblock is determined at a macroblock level by determining the reference picture index of frame unit at a picture (or slice) level and respectively allocating a lower index and a higher index to a top reference field and a bottom reference field while sequentially visiting the reference frames according to an order of reference picture index of frame unit, the top and bottom field indexes being giving by an equation:

top reference field index=2×picture index of reference frame; and bottom reference field index=2×picture index of reference frame+1.

According to further another embodiment of the present invention, there is provided a method for coding an interlaced moving picture into a frame picture having frame/field macroblock in a moving picture coding system using multiple reference picture, wherein a reference picture index of the frame macroblock is determined at a macroblock level by determining the reference picture index of frame unit at a picture (or slice) level and respectively allocating a lower index and a higher index to a bottom reference field and a top reference field while sequentially visiting the reference frames according to an order of reference picture index of frame unit, the top and bottom reference field indexes being given by an equation:

top reference field index=2×picture index of reference frame+1; and bottom reference field index=2×picture index of reference frame.

According to further another embodiment of the present invention, there is provided a method for coding an interlaced moving picture into a frame picture having frame/field macroblock in a moving picture coding system using multiple reference picture, wherein a reference picture index of the frame macroblock is determined at a macroblock level by determining the reference picture index of frame unit at a picture (or slice) level and alternately allocating indexes, which are increased by one, to reference fields, starting from a reference field having parity equal to a current field to reference field having parity different from the current field while sequentially visiting the reference frames according to an order of reference picture index of frame unit in the field macroblock.

According to further another embodiment of the present invention, there is provided a method for coding an interlaced moving picture into a frame picture having frame/field macroblock in a moving picture coding system using multiple reference picture, wherein a reference picture index of the frame macroblock is determined at a macroblock level by determining the reference picture index of frame unit at a picture (or slice) level allocating a lower index to a reference field close to a current field in view of time and allocating higher index to a reference field far from the current field in view of time while sequentially visiting the reference frames according to an order of reference picture index of frame unit, the indexes of the reference fields being given by an equation:

index of the reference field close to the current field=2×picture index of reference frame; and index of the reference field far from the current field=2×picture index of reference frame+1.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows macroblock pair in frame picture having general frame/field macroblock;

FIG. 2 shows reference picture indexes of P frame coding in a moving picture coding system according to the related art;

FIG. 3 shows the reference picture index lists 0 and 1 of B frame coding in a moving picture coding system according to the related art;

FIG. 4 shows reference picture indexes in a coding of top and bottom fields of P frame in a moving picture coding system according to the related art;

FIG. 5 shows reference picture index lists 0 and 1 in a coding of top and bottom fields of B frame in a moving picture coding system according to the related art;

FIG. 6 shows reference picture indexes reordered in a coding of P frame in a moving picture coding system according to the related art;

FIG. 7 shows reference picture indexes of P frame and B frame having frame macroblock in a moving picture coding system according to the present invention;

FIG. 8 shows reference picture indexes of P frame and B frame having field macroblock in a moving picture coding system according to the present invention (case 1);

FIG. 9 shows reference picture indexes of P frame and B frame having field macroblock in a moving picture coding system according to the present invention (case 2);

FIG. 10 shows reference picture indexes of P frame having field macroblock in a moving picture coding system according to the present invention (case 3);

FIG. 11 shows reference picture indexes of B frame having field macroblock in a moving picture coding system according to the present invention (case 3); and FIG. 12 shows reference picture indexes of P frame and B frame having field macroblock in a moving picture coding system according to the present invention (case 4).

BEST MODE FOR CARRYING OUT THE INVENTION

Hereinafter, preferred embodiments of the present invention will be described in detail with reference to accompanying drawings.

When an interlaced moving picture is coded into frame picture having frame/field macroblock, a moving picture coding system using multiple reference pictures must performs a motion compensation from a reference frame in order for frame coding in the frame macroblock. In other words, all reference pictures must be considered as frame unit. The moving picture coding system, however, must performs a motion compensation from a reference field in order for a field coding in the field macroblock. In other words, all reference pictures must be considered as field unit.

Accordingly, the frame pictures having frame/field macroblock must use indexes having different structures at macroblock level. For example, the frame macroblock uses a reference picture index of frame unit and the field macroblock uses a reference picture index of field unit. It should be considered that the reference picture indexes can be reordered at a picture or slice level.

Therefore, the frame picture having frame/field macroblocks should consider the reference picture in frame unit at a picture or slice level and have the reordered reference picture indexes of frame unit. It is necessary to determine reference picture index according to a coding mode of macroblock based on the reference picture indexes of the frame unit at the macroblock level.

The present invention provides a method for determining reference picture index in frame picture having frame/field macroblock. The method includes a process of determining reference picture index at a picture (or slice) level and a process of determining reference picture index at a macroblock level.

[1] Determination of Reference Picture Index at Picture (or Slice) Level

All the reference pictures are considered in frame unit at a picture or slice level and reference picture indexes of frame unit are calculated.

In the method or determining a reference picture index for P frame, reference frames are sorted in an order reverse to a coding order and indexes are allocated while visiting the sorted reference frames in sequence.

Reference picture indexes for B frame are determined based on a display order of the reference frames. First, in case of a reference frame list 0, indexes are allocated in a reverse order to reference frames whose display orders lag behind the B frame and the remaining indexes are allocated in the display order to reference frames whose display order lead the B frame.

In case of a reference frame list 1, in contrast to the reference frame list 0, indexes are allocated in the display order to reference frames whose display orders are higher than the B frame and the remaining indexes are allocated in a reverse order to reference frames whose display orders are lower than the B frame. When the reference picture indexes are reordered so as to enhance a coding efficiency, the reference picture indexes of frame unit are reordered.

[2] Determination of Reference Picture Index at Macroblock Level

The reference picture index is modified according to the coding mode of the macroblock while performing a coding in unit of macroblock pair with respect to the reference picture indexes of frame unit, which are obtained at the picture (or slice) level. This process will be described below.

[2.1] Case of Frame Macroblock

Since motion compensation must be performed to frame macroblocks from reference frame, the reference picture index should be frame unit. Accordingly, the reference picture indexes of frame unit, which are obtained at the picture (or slice) level, are used.

Reference frame stored in a reference buffer should be configured with field pair having parities opposite to each other. FIG. 7 shows reference picture indexes for frame macroblock in P frame and B frame when a size of the reference buffer is 5.

[2.2] Case of Field Macroblock

Since motion compensation must be performed to field macroblocks from reference field, the reference picture index should be field unit. In this case, field pair having parities opposite to each other is also present in the reference buffer. Accordingly, each reference frame is divided into two fields while sequentially visiting the reference frame according to the reference picture indexes of frame unit, which are obtained at the picture (or slice) level. Then, the reference picture indexes are newly allocated to each field. The reference picture indexes for two fields of each reference frame are allocated in various methods (Cases 1 to 4).

(Case 1)

Regardless of the top and bottom field macroblocks of a current field macroblock, a lower index is allocated to the top reference field and a higher index is allocated to the bottom reference field while sequentially visiting the reference frames in an order of the reference picture indexes, which are obtained at the picture (or slice) level.

In other words, the top and bottom reference field indexes can be given by an equation below.

Top reference field index=2×picture index of reference frame

Bottom reference field index=2×picture index of reference frame+1

FIG. 8 shows reference picture indexes for field macroblocks of P frame and B frame.

(Case 2)

Regardless of the top and bottom field macroblocks of a current field macroblock, a lower index is allocated to the bottom reference field and a higher index is allocated to the top reference field while sequentially visiting the reference frames in an order of the reference picture indexes, which are obtained at the picture (or slice) level.

In other words, the top and bottom reference field indexes can be given by an equation below.

Top reference field index=2×picture index of reference frame+1

Bottom reference field index=2×picture index of reference frame

FIG. 9 shows reference picture indexes for field macroblocks of P frame and B frame.

(Case 3)

Indexes that are increased by one are alternately allocated to reference fields, starting from the reference field having a parity equal to the current field to the reference field having a parity different from the current field, while sequentially visiting the reference frames according to a reference picture index order of the picture (or slice) level. FIGS. 10 and 11 show reference picture indexes for the field macroblocks of P frame and B frame.

(Case 4)

Regardless of the top and bottom field macroblocks of a current field macroblock, a lower index is allocated to reference field close to the current field in view of time and a higher index is allocated to reference field far from the current field in view of time while sequentially visiting the reference frames in an order of the reference picture indexes of the picture (or slice) level.

In other words, the reference field indexes can be given by an equation below.

Reference field index close to the current field=2×picture index of reference frame Reference field index far from the current field=2×picture index of reference frame+1

In FIG. 12, there are shown reference picture indexes for field macroblock of P frame and B frame.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

According to a coding a moving picture method of the present invention, when a moving picture coding system using multiple reference pictures codes an interlaced moving picture into a frame picture having frame/field macroblock, the moving picture coding system efficiently provides reference picture information used for motion compensation by differently determining reference picture index according to coding modes of macroblocks.

The invention claimed is:

1. A method of determining a reference field picture for decoding a current field macroblock in a bi-predictive frame, comprising:

determining, by a moving picture decoder, a reference frame picture index in a reference picture list for the bi-predictive frame based on a display order;

determining, by the moving picture decoder, a reference field picture for the current field macroblock from the reference picture list, the determined reference field picture being one of a top field and a bottom field of a reference frame;

wherein the determining step determines a field having a same parity as the current field macroblock or a different parity from the current field macroblock as the reference field picture based upon reference picture index information, the reference frame picture index, and field parity of the current field macroblock, wherein if the reference picture index information is an odd index number, then the determined field has a field parity different from the current field macroblock decoding the current field macroblock using the determined reference field picture.

2. The method of claim 1, wherein if the reference picture index information is an even index number, then the determined field has a same parity as the current field macroblock.

* * * * *